2,742,501

METHOD OF PRODUCING ALKYLIDENE BIS-AMIDES

Johannes Kleine, Munich, Erwin Heisenberg, Erlenbach (Main), and Rudolf Lotz, Klingenberg (Main), Germany, assignors to Vereinigte Glanzstoff-Fabriken Aktiengesellschaft, Wuppertal-Elberfeld, Germany, a joint-stock company of Germany No Drawing. Application October 7, 1954,
Serial No. 461,041

Claims priority, application Germany June 11, 1951

6 Claims. (Cl. 260—562)

This invention relates to alkylene, alkylidene, and aralkylidene bis-amides, and to a new process for their preparation. More specifically, the invention relates to such bis-amides having the general formula:

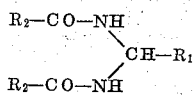

where $R_1$ is hydrogen, alkyl, alkenyl, halogenated alkyl, aryl, or heterocyclic, and $R_2$ is alkyl, halogenated alkyl, carboxyalkyl, or aryl.

We have found, according to the present invention, that compounds corresponding to the above general formula may be prepared more easily and rapidly, with improved yield and purity, when the materials used for their synthesis are reacted in the gaseous or vapor phase.

The methods of the prior art were confined to conducting the reaction for the preparation of bis-amides in the liquid phase. The discovery of the feasibility and advantages of conducting the reaction in the vapor phase comprises a most important aspect of the present invention. It could not be predicted from known methods of synthesis that vapor phase operation according to our invention would result in direct production of these substances. Among the advantages of the vapor phase process are an almost instantaneous conversion with the elimination of prolonged heating to bring about the reaction, and the obtaining of the compounds in a technically pure state immediately upon passing the reaction mixture through the reaction zone followed by cooling. In industrial operations this is significant in eliminating additional washing and purification steps. The most decisive advantage of the vapor phase method of our invention lies in the fact that it may be run as a continuous process without the necessity of cumbersome separate heating of individual liquid charges, the products being obtained in practically pure (and usually crystalline) form simply by cooling.

The alkylene-, alkylidene-, and aralkylidene-bis-amides are prepared in accordance with the present invention by reacting, in the vapor phase, an aliphatic, aromatic or heterocyclic aldehyde, a mononitrile of a saturated aliphatic or aromatic acid, an acid, and water. Based upon stoichiometric considerations, the reaction would require approximately 1 mol each of aldehyde and water, and 2 mols of nitrile, but in actual practice, these molar proportions may be subject to wide variations, depending upon considerations of type of compound being prepared, time, and yield.

The aldehyde used has the general formula $R_1CHO$, where $R_1$ is hydrogen, alkyl, alkenyl, aryl, or a heterocyclic group. Formaldehyde may be used where methylene-bis-amides are to be prepared. In place of formaldehyde itself, compounds may be used which are capable of generating formaldehyde by decomposition. For example, paraformaldehyde upon heating decomposes to form formaldehyde. Monochloracetic acid at temperatures of about 400° C. decomposes to form formaldehyde, hydrogen chloride, and carbon monoxide. Examples of other aldehydes which may be used in accordance with our invention include: acetaldehyde, propionaldehyde, chloral, acrolein, benzaldehyde, and furfural. Other aldehydes may also be used which are capable of vaporization.

The mononitriles of saturated aliphatic or aromatic acids which may be used in carrying out the reaction are those having the general formula $R_2CN$, where $R_2$ is alkyl, halogenated alkyl, carboxyalkyl, or aryl. Thus, for the purposes of the present invention, we may use all saturated aliphatic and aromatic mononitriles, including those which are substituted by a halogen or carboxyl group, and which are capable of vaporization. Examples of such aldehydes include: acetonitrile, propionitrile, benzonitrile, and substituted derivatives such as cyanovaleric acid, cyanopropionic acid, cyanobutyric acid, cyanocaproic acid, as well as α or β-chlorpropionitrile, α-, β-, or γ-chlorbutyronitrile, α- or β-chlorvaleric acid nitrile, α-brompropionitrile, α,β-dibrompropionitrile, α,α,β-tribrompropionitrile, α-brombutyronitrile, and α-bromvaleric acid nitrile. Mixtures of nitriles of the type exemplified above may also be used in the reaction with aldehydes, acid and water in the vapor phase.

The proportions in which the reactants are employed may vary within wide limits. Thus, the nitriles and aldehydes may be used in equimolecular proportions; it is preferable, however, to work with an excess of aldehyde, reacting, for example, a molar ratio of 1:5.

The presence of water is essential for the reaction, in some instances only a relatively small amount in relation to the amount of nitrile used, is required. The ratio of 1:1 by weight is preferably not exceeded. The water may be brought into the reaction by use of aqueous solutions of aldehydes or acids, or both.

As acids, volatile acids such as hydrochloric acid, hydrobromic acid and hydriodic acid have been found particularly suitable. A volatile organic acid such as acetic acid is also well adapted for purposes of this invention. The quantity of acid employed is variable. Using the quantities of reaction components given in the examples below, from about 20 to 50 liters per hour of acid may be passed through the reaction tube. The acid appears to have a catalytic effect in promoting the type of condensation reaction which forms the basis of the process of our invention.

Although the reaction according to the present invention can take place without the use of surface-active type catalyst, the use of such a catalyst greatly increases the yield. In general, useful catalysts of this type, or mixtures thereof, include aluminum oxide, silica gel, clay shards, zinc oxide, and boron phosphate. Thus a mixture of 50 parts by weight of boron phosphate and 50 parts of aluminum oxide, or a mixture of 50 parts boron phosphate and 50 parts zinc oxide have been found to be particularly suitable.

We have also found that the vapor phase reaction may be carried out advantageously in an atmosphere of inert gas, meaning thereby a gas which will not react with the gaseous reactants or with the resulting bis-amide. Examples of inert gases include nitrogen or rare gases.

The reaction may be carried out very simply, in a single stage process, by passing a current of nitrile, aldehyde, acid, and water vapors through an electrically heated reaction tube or vessel, heat having been applied to the various reactants to bring them to the gaseous state. If they are introduced into the reaction tube in liquid form, vaporization occurs in the reaction vessel. The reactants are brought up to reaction temperature in the tube. The temperatures to be used depend upon the nitrile and aldehyde employed and range between about 150–500° C. The reaction tube may be filled or have disposed within it upon a grating, suitable catalysts, of the type described above. The acid vapors may be introduced in admixture with nitrogen, acting as an inert gas.

The known compounds prepared by our new method may be polymerized to furnish valuable resinous materials, as by reacting one terminal halogen with ammonia followed by polymerization, which may be employed in the various arts in which such materials find application, for instance in the preparation of molding powders, films, and as coating materials for paper, wood, metal and cloth.

Further details of the practice of this invention are set forth in the following illustrative examples:

EXAMPLE I

*Preparation of methylene-bis-acetamide*

82 g. (2 mols) of acetonitrile are introduced dropwise, together with 400 g. of formaldehyde in 35% aqueous solution, into an electrically heated tube, while simultaneously passing in a gaseous mixture of one part hydrogen chloride and one part of oxygen-free nitrogen, at a rate of 20 liters per hour. The tube is filled with 50 g. of a catalyst comprising 25 parts by weight of boron phosphate and 25 parts of aluminum oxide. There is obtained 125 g. of a white substance, which may be recrystallized from acetone, and then has a melting point of 196° C. It is methylene-bis-acetamide, in a yield of 90 g.

EXAMPLE II

*Preparation of ethylidene-bis-acetamide*

164 g. of acetonitrile are slowly introduced, dropwise, together with 240 g. acetaldehyde dissolved in an equal amount of water into a tube electrically heated to a temperature of 200–250° C. Simultaneously there is led into the tube at the rate of 25 l. per hour a mixture of one part hydrogen chloride gas and one part of nitrogen free from oxygen. The tube is filled with 60 g. of a catalyst composed of 30 parts by weight boron phosphate and 30 parts aluminum oxide. The vapors issuing from the tube are collected in a cooled receiver. After recrystallization of the condensate from acetone, there is obtained ethylidene-bis-acetamide, melting point 170° C., in a yield of 160 g.

EXAMPLE III

*Preparation of ethylidene-bis-benzamide*

30 g. of benzonitrile are passed, simultaneously with 100 g. of acetaldehyde dissolved in 100 g. water, hydrogen chloride gas and oxygen-free nitrogen, through an electrically heated tube the temperature of which is between 200–250° C. The HCl-gas is in the ratio of one part to one part nitrogen, and the rate of flow of the mixture is 25 liters per hour. The tube is filled with 60 g. of a catalyst comprising 30 parts of boron phosphate and 30 parts of aluminum oxide or 30 parts of zinc oxide. The vapors issuing from the tube are collected in a receiver. The resulting product is ethylidene-bis-benzamide having a melting point of 197–198° C. The yield is 32 g.

EXAMPLE IV

*Preparation of methylene-bis-benzamide*

30 g. of benzonitrile and 170 g. of a 35% solution of formaldehyde in water are passed, together with a mixture of hydrogen chloride gas and oxygen-free nitrogen, for about 2 to 3 hours, through a tube heated to about 250° C. and filled with catalyst. The gas mixture comprises one part hydrogen chloride and one part nitrogen and the flow rate is 25 liters per hour. The amount of catalyst used is 60 g. and its composition 30 parts by weight boron phosphate and 30 parts aluminum oxide, or else 30 parts boron phosphate and 30 parts zinc oxide are used. The weight of catalyst is 60 g. The vapors issuing from the tube are collected in a cooled receiver, and the resulting product, methylene-bis-benzamide, purified in the usual manner. The melting point is 247° C. and the yield 45 g.

EXAMPLE V

*Preparation of ethylidene-bis-β-chlorpropionamide*

90 g. of β-chlorpropionitrile are passed, dropwise, together with 132 g. acetaldehyde dissolved in about 300 cc. water, over a period of about 2 hours, into an electrically heated tube into which hydrogen chloride is also passed, at a rate of about 30 liters per hour. The tube is filled with 60 g. of a catalyst composed of 30 parts boron phosphate and 30 parts aluminum oxide. The temperature in the tube is 250–300° C. The molar ratio of nitrile to aldehyde, for best results, ranges from 1:3 to 1:5. The vapors issuing from the tube are collected in a cooled receiver, whereupon the bulk of the product separates out in solid form. The crystalline substance obtained by suction filtering and recrystallization from alcohol is ethylidene-bis-β-chlorpropionamide, melting point 149° C. The yield is 105 g.

EXAMPLE VI

*Preparation of ethylidene-bis-α,β-dichlorpropionamide*

124 g. of α,β-dichloropropionitrile are passed dropwise, simultaneously with a solution of 132 g. acetaldehyde in about 300 cc. of water, at a temperature of 200–250° C., through an electrically heated tube into which HCl is passed at a rate of 25 liters per hour. The tube is filled with 60 g. of a catalyst composed of 30 parts boron phosphate and 30 parts aluminum oxide. The issuing vapors are collected in a cooled receiver, whereby the bulk of the product separates out in solid form. After suction filtration and recrystallization from alcohol, ethylidene-bis-α,β-dichlorpropionamide is obtained, melting point 186° C. The yield is 120 g.

EXAMPLE VII

*Preparation of methylene-bis-α,β-dichlorpropionamide*

124 g. of α,β-dichlorpropionitrile and 460 g. of a 35% aqueous formaldehyde solution are slowly charged, drop by drop, into a nearly horizontal, electrically heated tube into which are passed simultaneously a mixture of one part of hydrogen chloride gas and one part nitrogen at a rate of 20 liters per hour. The tube is filled with 60 g. of a catalyst comprising 30 parts boron phosphate and 30 parts aluminum oxide. The temperature in the tube is 250–300° C. The charge is so controlled that the ratio by weight of nitrile to formaldehyde solution amounts to about 1:4. The charging period is 3 to 5 hours. The issuing vapors are collected in a cooled receiver whereupon the bulk of the product separates out in solid form. It is suction filtered and recrystallized from alcohol, having a melting point of 195° C. The yield of methylene-bis-α,β-dichlorpropionamide is 100 g.

EXAMPLE VIII

*Preparation of methylene-bis-α,α,β-trichlorpropionamide*

188.5 g. of α,α,β-trichlorpropionitrile are passed dropwise simultaneously with 460 g. of a 35% aqueous solution of formaldehyde into an electrically heated tube. The tube is filled with 60 g. of a catalyst comprising zinc oxide spread on sieves. At the same time a continuous current of 30 liters per hour of one part HCl gas and one part nitrogen is passed through the tube. The temperature of the tube is 320–350° C. The reaction product is collected and purified as described in Example V. There are obtained 155 g. of methylene-bis-α,α,β-trichlorpropionamide.

EXAMPLE IX

*Preparation of ethylidene-bis-adipic acid amide*

130 g. of δ-cyanovaleric acid are passed dropwise, together with 200 g. acetaldehyde dissolved in an equal quantity of water, into an electrically heated tube, while also passing in a mixture of one part hydrogen chloride and one part oxygen-free nitrogen at the rate of 25 liters per hour. The temperature of the tube, which acts as an oven, is 200–250° C. The tube is filled with 60 g. of catalyst composed of 30 parts boron phosphate and aluminium oxide. The receiver is strongly cooled so that a portion of the desired reaction product precipitates in the form of a solid in the receiver. The ethylidene-bis-adipic acid amide obtained on purification in the usual manner has a melting point of 183–184° C. The yield is 95 g.

EXAMPLE X

*Preparation of benzylidene-bis-α,α,β-trichlorpropionamide*

200 g. of α,α,β-trichlorpropionitrile are passed dropwise simultaneously with 530 g. of benzaldehyde and 100 g. water, into an electrically heated tube into which hydrogen chloride is also passed at the rate of 25 liters per hour. The reaction lasts from 3 to 5 hours. The tube is filled with 200 g. of a catalyst composed of 100 g. each of boron phosphate and aluminum oxide. The reaction temperature is 350–380° C. The issuing vapor is condensed and yields a colorless product melting at 119–121° C., yield 110 g., and having the following formula:

ClCH₂.CCl₂.CO.NH.CH.NH.CO.CCl₂.CH₂Cl

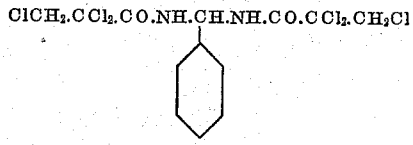

EXAMPLE XI

*Preparation of ethylidene-bis-α,α,β-trichlorpropionamide*

158.5 g. of α,α,β-trichlorpropionitrile are passed dropwise simultaneously with 450 g. of acetaldehyde mixed with 300 g. of water, into an electrically heated tube. The tube is filled with zinc oxide distributed on sieves. At the same time, 30 liters of hydrogen chloride gas and an equal quantity of nitrogen are passed per hour through the tube. The temperature of the tube is about 350° C. The reaction product is collected and purified as in Example V. It is ethylidene-bis-α,α,β-trichlorpropionamide of the following constitution:

ClCH₂.CCl₂.CO.NH.CH.NH.CO.CCl₂.CH₂Cl
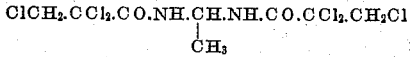

The compound is colorless, melts at 158–160° C., and the yield is 105 g.

EXAMPLE XII

*Preparation of ethylidene-bis-α,β-dibrompropionamide*

400 g. of α,β-dibrompropionitrile are passed dropwise, simultaneously with 2000 g. of acetaldehyde to which 500 g. water have been added, over a period of 3–5 hours into an electrically heated tube at about 350–380° C. At the same time a current of one part hydrogen bromide and one part nitrogen is passed through the tube, at a rate of 50–200 liters per hour. Upon condensation of the vapors issuing from the tube a solid product separates out which is recrystallized from acetone. It has a melting point of 154–155° C., the yield being 250 g. and has the formula:

BrCH₂.CHBr.CO.NH.CH.NH.CO.CHBr.CH₂Br
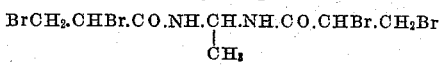

EXAMPLE XIII

*Preparation of methylene-bis-α,β-dibrompropionamide*

320 g. of α,β-dibrompropionitrile are passed dropwise, simultaneously with a 35% solution in water of 800 g. formaldehyde, over a period of 3–5 hours into a tube electrically heated to 350–380° C. The issuing vapors are collected in a cooled receiver whereupon the product separates out in solid form. It is recrystallized from ethanol. The colorless crystalline product obtained is methylene-bis-α,β-dibrompropionamide, with a melting point of 172–174° C. The yield is 200 g.

EXAMPLE XIV

*Preparation of ethylidene-bis-α-brompropionamide*

134 g. of α-brompropionitrile are passed slowly drop by drop, over a period of 3–4 hours, simultaneously with 500 g. acetaldehyde and 100 g. of water, into an electrically heated tube through which a mixture of one part hydrogen bromide and one part nitrogen, are passed at the same time, at a rate of 25 liters per hour. The temperature in the tube is about 300° C. By cooling the receiver a solid, colorless product is obtained which, after recrystallization from dioxane, has a melting point of 159° C. The yield is 90 g.

This application is a continuation-in-part of our patent applications Serial No. 289,666, filed May 23, 1952, and Serial No. 295,114, filed June 23, 1952, both of which are now abandoned.

We claim:

1. The method of preparing bis-amides having the general formula

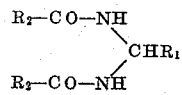

wherein R₁ is a member of the class consisting of hydrogen and lower alkyl, chloro-lower alkyl, monocyclic aryl, and furyl groups, and R₂ is a member of the class consisting of lower alkyl, chloro-lower alkyl, bromo-lower alkyl, and monocyclic aryl groups, which comprises vaporizing a saturated mononitrile selected from the class consisting of lower alkyl, chloro-lower alkyl, bromo-lower alkyl, and monocyclic aryl nitriles, and contacting said nitrile while in the vapor phase, at a temperature from about 150° C. to 500° C. with an aldehyde selected from the group consisting of formaldehyde, and saturated lower alkyl, saturated chloro-lower alkyl, monocyclic aryl, and furyl aldehydes which vaporize at a temperature from about 150° C. to 500° C. in the presence of acid vapor, water vapor, and a catalyst selected from the group consisting of boron phosphate, aluminum oxide, zinc oxide, silica gel, and mixtures thereof, the molar amount of aldehyde ranging from one to five times the molecular quantity of nitrile, the quantity by weight of water being at most equal to the quantity of nitrile, and collecting the resulting bis-amide.

2. The method of claim 1, wherein the aldehyde is formaldehyde.

3. The method of claim 1, wherein the aldehyde is acetaldehyde.

4. The method of claim 1, wherein the aldehyde is benzaldehyde.

5. The method of claim 1, wherein the nitrile is β-chlorpropionitrile.

6. The method of claim 1, wherein the nitrile is α,β-dichlorpropionitrile.

References Cited in the file of this patent

UNITED STATES PATENTS 2,270,520   Graenacher et al. _____ Jan. 20, 1942

(Other references on following page)